April 26, 1966 J. GROLEE 3,248,177
APPARATUS FOR THE TREATMENT OF THE CONTAMINATED AIR
FROM ALUMINUM ELECTROLYSIS
Filed Feb. 13, 1963 2 Sheets-Sheet 1

INVENTOR.
Jean Grolee
BY
Ooms, McDougall & Hersh
Att'ys

INVENTOR.
Jean Grolee

United States Patent Office 3,248,177
Patented Apr. 26, 1966

3,248,177
APPARATUS FOR THE TREATMENT OF THE CONTAMINATED AIR FROM ALUMINUM ELECTROLYSIS
Jean Grolee, 20 Blvd. Souchet, Paris, France
Filed Feb. 13, 1963, Ser. No. 258,197
Claims priority, application France, Feb. 15, 1962, 888,122
11 Claims. (Cl. 23—262)

This invention relates to the treatment of fumes released in connection with the production of aluminum by electrolysis and it relates more particularly to the removal and the recovery of fluorinated products carried by or in such fumes.

In the electrolytic production of aluminum, use is made of a series of electrolysis basins or pots, each of which is provided with a cathode in the body of the pot and an anode which may be either pre-baked or of the self-baking type known as a "Soderberg" anode. The combustion of the anodes occurs with the evolution of gases including light hydrocarbons, carbon monoxide, sulphated compounds and the like. Such evolution is more important in the case of the self-baking Soderberg type anodes than with the pre-baked anodes. The gases evolved are loaded with fluorinated products which emanate from the cryolite.

The air that fills the building in which the pot line is contained is also highly charged with various materials, such as alumina, tars, soots, fluorinated products and sulphated products. This necessitates the use of a highly efficient filtering system to effect constant interchange of the atmosphere. The fumes from the plant sometimes harmfully affect the health of the people within the plant and in the neighborhood as well as animals, crops and the like, if allowed to escape into the outside atmosphere.

Thus it is an object of this invention to provide a means and method for the treatment of fumes and gases from the production of aluminum by electrolysis for the removal of dusts, contaminants and undesirable fumes, and it is a related object to provide a new and improved process and equipment for the recovery of gases of commercial value contained within the fumes.

These and other objects and advantages of this invention will hereinafter appear and for purposes of illustration, but not of limitation, an embodiment of the invention is shown in the accompanying drawings, in which—

Figure 1:
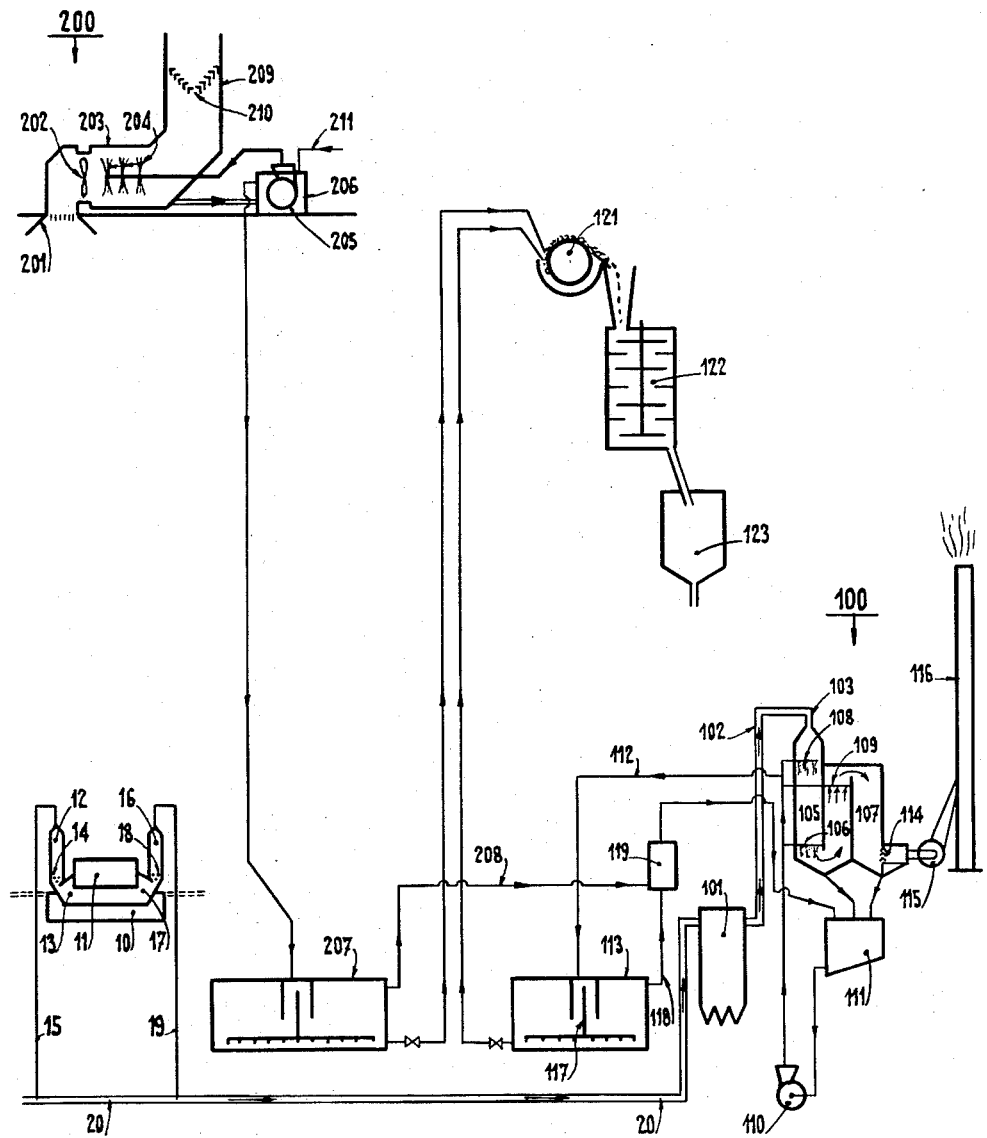
FIG. 1 is a schematic diagram of an installation embodying the features of this invention.

In accordance with the practice of this invention, the fumes within the aluminum production plant are treated by the combination of two circuits which may be described as follows:

(1) A circuit, known as the earth circuit, collects the gases issuing from the skirts of the electrolytic pots at a low rate of flow and which are characterized by a high fluorine content. The circuit comprises the combination of an electrostatic precipitator which receives the gases emitted by the burners in the combustion of the electrolysis gas and from the self-baking of the anodes for the removal or arrest of tars, dusts and the like solid particles in suspension; at least one washer provided with means for atomization of or distribution of at least one suitable aqueous solution which extracts the fluorine compounds and the sulphated compounds from the gas.

(2) A circuit, known as the roof circuit, which collects the gas from the atmosphere within the plant. The gases in the roof circuit, which operate at a high flow rate, are characterized by a fluorine content which is very low and the circuit includes a circulating device which withdraws the ambient air from within the plant and circulates it through at least one washer provided with atomizers for distribution of a suitable aqueous medium for contact with the gases flowing therethrough to retain the solid material in suspension and to dissolve out the fluorine and sulphated compounds.

The aqueous solution atomized or otherwise distributed to wash the gases in the earth circuit comprises an aqueous solution of sodium aluminate which reacts with the fluorine to form cryolite and with sulphated compounds to form sodium sulphate. The aqueous solution atomized to wash the gases in the roof circuit comprises an aqueous solution of sodium carbonate which dissolves fluorine as sodium fluoride and the sulphur as sodium sulphate.

Referring now to the drawings for a better understanding of the invention, the electrolytic pot or basin includes a pot 10 and an anode 11 which, in the illustrated modification, is of the Soderberg type, although other anodes can be used. The pot is equipped with two burners 12 and 16 to insure the combustion of gases such as carbon monoxide and sulphur and tars originating from the self-baking of the anode 11. The lower part of each burner is linked at 13 and 17 with the skirt of the pot 10 so as to draw off the gases and tars. The upper part of each skirt has inlets 14 and 18 for the passage of air for the combustion. The upper part of each burner is linked to conduits 15 and 19 to conduct the burnt gases to the collectors 20.

The earth circuit 100 collects the gases from the skirt of the basin or pot. This is a circuit of low flow rate and with a high fluorine concentration so that it is desirable to precede the washing step or steps with the removal of dusts, tars and soot or other solid particles, as by electrical precipitation means, with the allowance for the possibility of later precipitating a purer cryolite. The gases enter through the collector 20 for passage through the electrical precipitator 101 which is effective to remove tars, soot and dusts of alumina and sublimed fluorine products. The gases leave the precipitator 101 through conduit 102 for passage into the washer 103 which, in the illustrated embodiment, is constructed of concrete but which might equally be constructed of other structural materials which are resistant to the gases and reagents to which the chamber is exposed or else is lined with suitable resistant material.

The washer 103 is divided into a plurality of components, such as the compartments 105, 106 and 107, which are representative since more compartments may be employed. In some of the compartments, such as in compartments 105 and 106, an aqueous solution of sodium aluminate is introduced by sprayers or atomizers 108 and 109 respectively. It will be understood that such aqueous treating solution can be introduced into all of the compartments and that the aqueous treating solution can be formulated of other water soluble alkali metal or ammonium aluminates.

The solution in which the removed fluorine is fixed as the acid cryolite and removed sulphur as alkali metal sulphate is recycled by at least one pump 110 and at least one tank 111 with a portion of the recycle being continuously removed for passage through conduit 112 to decanter 113.

The last compartment in the system, such as compartment 107, in the illustrated modification, preferably does not have a sprayer or atomizer. Instead it is provided at its outlet to the ventilator 115 with a droplet separator 114 in the form of a stream or streams of water which operate to free the air from water particles before venting the cleaned gases to the chimney 116 for release into the atmosphere.

The portion of the solution bled from the system is introduced into the decantation tank 113 fitted wih an agitator 117 for the purpose of avoiding too high a collection of the solid deposits. The clarified supernatant liquids, separated by decanation from the tank 117, are withdrawn through conduit 118 for re-use as aqueous wash media after addition of reagent in tank 119 to make up the solution to the desired concentration. The decanted cryolite is removed through tube 120 and filtered by the filtration means 121 and then dried in drier 122 before displacement into storage in bins 123. For the efficient removal of fluorine and sulphated compounds in accordance with the practice of this invention, it is desirable to make use of a wash solution in which the alkali metal aluminate such as sodium aluminate is present in a concentration within the range of 200 to 270 grams per liter and, preferably, 230 g./l.

The roof circuit 200 treates the air from the atmosphere within the plant. In the light of the need for maintaining a proper atmosphere, the gases are processed at a high flow rate and are thus characterized by such low fluorine content and low solids content as to make it unnecessary to make use of an electrical precipitator or other pre-treatment means to remove solids, dusts, tars, etc. As a result, the use of an alkali metal aluminate, such as the sodium aluminate used as the reagent dissolved in the aqueous treating composition for the earth circuit, would result in the recovery of an impure cryolite because it would be contaminated with tars, soot, and the like. Instead, the fluorine is recovered in the roof circuit in a soluble form by the use of a reagent dissolved in the aqueous medium in the form of sodium carbonate or other alkali metal or ammonium carbonate. This permits the soluble alkali metal fluoride to be recovered by separation from the contaminated muds by the simple process of decantation. The clear solution that is obtained after settling of the mud can be mixed with the sodium aluminate in tank 119 to fix the sodium fluoride on the precipitated cryolite.

In the roof circuit 200, the air from within the plant is drawn by fan 202 through a hood 201 and blown into the washer 203 into which sodium carbonate solution is sprayed or atomized by the sprayers 204. The solution is recycled by the pump 205 from the collection tank 206. The solid materials such as alumina, sublimed fluorine products, tars, soots, etc. are maintained in suspension while the fluorine and sulphur are dissolved as sodium fluoride and sodium sulphate. A portion of the wash waters enriched in solid materials and dissolved products are continuously removed from the recycle to a decanter 207 wherein the solids are allowed to settle for separation from a cleared solution. The clarified liquors from the decanter 207 are advanced through conduit 208 to the tank 119 for mixture with the sodium aluminate whereby the sodium fluoride becomes fixed on the cryolite precipitated in the earth circuit 100. Make-up alkali metal carbonate is introduced into the system 200 through conduit 211. The aqueous compositions used to wash the gases in the roof circuit 200 are formulated to contain an amount of alkali metal carbonate within the range of 130 to 200 grams per liter and, preferably, 160 g./l.

The gases leaving the washer 203 are exhausted through a chimney 209 fitted with baffles 210 over which streams of water flow to wash the air free of particles of water before release into the atmosphere.

The solid phase separated in decanter 207 is processed through at least one filter and at least one drier, such as the filter 121 and drier 122 of the earth circuit 100 or which may alternately be used to serve both circuits. The cryolite obtained by the process is grilled before use to free the cryolite from soots and tars.

While existing sprayers or atomizers can be used as the sprayers 108 and 109 in circuit 100 or sprayers 204 in the circuit 200, it has been found that present devices have only allowed a reduction of 55% in the solid particles contained in the fumes. Further, and especially in the case of the sprayer 204, the abrasion formulated by the solid particles remaining in the gaseous stream has reduced the operating life of the sprayer to about two months before replacement is required.

Figure 2:
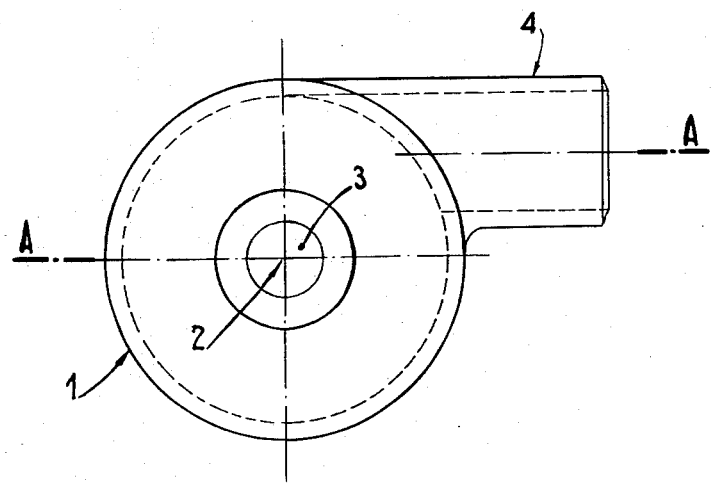
FIG. 2 is a side elevational view of an atomizer for injection of the aqueous wash solutions.
Figure 3:
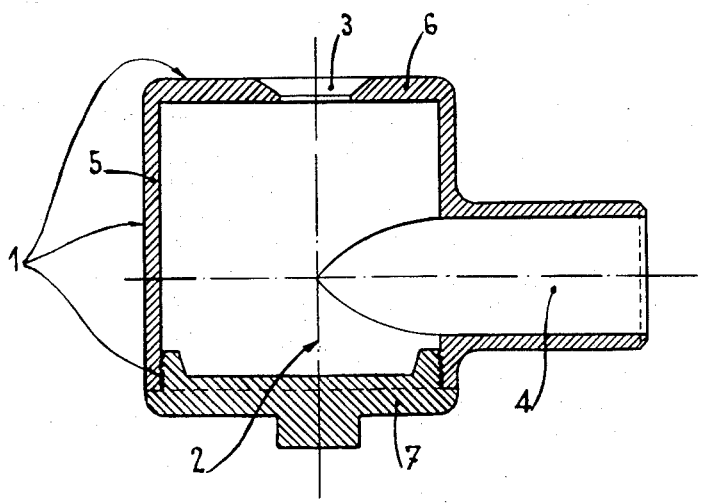
FIG. 3 is a sectional elevational view taken along the line A—A of FIG. 2.

If, in accordance with an important feature of this invention, use is made of eccentric sprayers of the type illustrated in FIGS. 2 and 3, instead of conventional sprayers, the process permits the achievement of 95% dust removal. The sprayer of FIGS. 2 and 3 has a hollow body of revolution 1 which extends around an axis 2 and is completely closed. One of the points at which the axis 2 intersects the body 1 is pierced to provide an outlet aperture 3. An inlet tube 4 for the introduction of liquid under pressure intersects the body of revolution near the other intersection point and is substantially tangent to the cylindrical surface of the hollow body 1. In the example shown, the hollow body 1 is composed of a cylindrical section 5 closed at its ends by two bases 6 and 7 wherein one (6) is formed with an outlet aperture 3 and the other (7) is near the inlet tube 4 which is tangential to the cylindrical section, the base 7 being dismountable in the illustrated modification so as to facilitate inspection or possible cleaning of the interior. The hollow body 1 may have other shapes. For example, it may be hemispherical or conical or a combination between a cylinder and a cone of a spherical section or a right section member whose radius regularly diminishes from the base 7 to the opposite base 6.

The useful life is enhanced by the choice of materials for the construction of the atomizer or sprayer. For example, a sprayer formed of polyamides has given satisfactory results as well as products known in the industry as "rilsan" and various of the "nylons" have given equally satisfactory results.

The ventilator 202, the collar containing the washing elements 203 and the distributing conduits for the liquid can be manufactured of polyvinyl chloride.

As used herein, the term "sulphated" is meant to refer to the reaction products of sulphur and the compounds thereof.

It will be understood that other installations for purification of the gases aside from the electrical precipitator may be employed and that other changes may be made in the details of construction, arrangement and operation of the equipment and in the materials, without departing from the spirit of the invention, especially as defined in the following claims.

I claim:
1. Apparatus for the treatment of gases given off during production of aluminum by electrolytic cells of the Soderberg type to recover components and produce cryolite, the combination of an earth circuit for the recovery of fluorine and compounds of fluorine present in large concentrations in the gases given off at the cells and a roof circuit for the recovery as the fluoride or fluorine and compounds of fluorine which exist in the atmosphere within the enclosure in which the cells are located, the earth circuit comprising a hood about each cell for collection of the gases given off from the bath, a separator for the removal of solids in the form of dusts, soot and tars from the gases, means for transmission of the gases from the hood to the separator for the removal of solids from the gases, a washer through which the cleaned gases are circulated from the separator, a means for mixing an aqueous wash solution formed of an aqueous solution of soluble fluoride recovered from the roof circuit and an aqueous solution of an aluminate selected from the group consisting of an alkali metal aluminate and ammonium aluminate which reacts with the fluorine and compounds of fluorine to produce an acid cryolite, means for contacting the cleaned gases in the washer with the aqueous wash solution, means for recirculating at least a part of the wash solution through the washer, means for bleeding off a part of the wash solution containing acid cryolite, a separator for separation of acid cryolite from the wash solution and means for return of the wash solution to the washer after the cryolite has been removed, the roof circuit comprising means for the removal of atmospheric gases at a high flow rate, a washer through which the atmospheric gases are circulated, means for contacting the atmospheric gases in the washer with an aqueous solution of soluble carbonate selected from the group consisting of an alkali metal carbonate and ammonium carbonate which react with the fluorine and compounds of fluorine to form the corresponding soluble fluoride, means for separating the wash composition containing a soluble fluoride from residue present in the wash issuing from the washer, and means for transmission of the wash composition containing the soluble fluoride to the means for mixing with the aqueous aluminate in the earth circuit whereby the soluble fluoride becomes fixed on the cryolite precipitated in the earth circuit.

2. An apparatus as claimed in claim 1 in which the means for separating the acid cryolite from the wash solution comprises a settling tank in which the wash solution from the washers is introduced, means for separating the supernatant liquid, and means for removal of the solids as product.

3. An apparatus as claimed in claim 2 which includes a filter and a drier and means for advancing the product first through the filter and then through the drier.

4. An apparatus as claimed in claim 1 in which the roof circuit includes a tank into which the wash solution from the washers is introduced and a pump for recycling the solution to the washers.

5. An apparatus as claimed in claim 1 in which the roof circuit includes a filter and a drier and means for advancing the solids first through the filter and then through the drier.

6. An apparatus as claimed in claim 1 in which the means for atomizing the wash solutions comprises a hollow body of revolution around an axis having an outlet opening at the point of intersection between the axis of the revolution with the hollow body and an inlet opening in the vicinity of the other point of intersection for the introduction of liquid under pressure and in which the opening is substantially tangent to the periphery of the hollow body.

7. An apparatus as claimed in claim 1 in which the hollow body of revolution comprises a cylindrical section in which the inlet forms a tangent with the periphery of the cylindrical section in a portion opposite the portion containing the outlet opening.

8. An apparatus as claimed in claim 1 in which the atomizer is formed of a synthetic plastic material.

9. An apparatus as claimed in claim 8 in which the atomizer is formed of a polyamide resin.

10. An apparatus as claimed in claim 1 which includes burners for combustion of combustible material within the gases removed from the cells in the earth circuit and means for circulating the gases from the hood to the burners before advancement of the gases to the separator means in the earth circuit.

11. An apparatus as claimed in claim 1 in which the gases removed from the cells and from the atmosphere contain sulphur and compounds of sulphur and wherein such sulphur and compounds of sulphur are reacted with the carbonate to form the corresponding sulphate in the roof circuit and with the aluminate to form the corresponding sulphate in the earth circuit.

References Cited by the Examiner

UNITED STATES PATENTS

| | | | |
|---|---|---|---|
| 1,293,108 | 2/1919 | Judson | 239—468 |
| 2,031,554 | 2/1936 | Torchet | 23—2 X |
| 2,997,132 | 8/1961 | Allander et al. | 98—43 X |
| 3,064,408 | 11/1962 | Erga et al. | 55—71 |
| 3,075,708 | 1/1963 | Cooprider | 239—490 |

MORRIS O. WOLK, *Primary Examiner.*

JAMES H. TAYMAN, JR., *Examiner.*